United States Patent
Cai et al.

(10) Patent No.: US 11,283,994 B2
(45) Date of Patent: Mar. 22, 2022

(54) SYNCHRONIZATION MECHANISM FOR IMAGE CAPTURE AND PROCESSING SYSTEMS

(71) Applicant: QUALCOMM Incorporated, San Diego, CA (US)

(72) Inventors: Songhe Cai, San Diego, CA (US); Scott Cheng, Foothill Ranch, CA (US); Rohan Desai, San Diego, CA (US); Jiafu Luo, Irvine, CA (US); Krishnam Indukuri, San Diego, CA (US); Abhay Raut, San Diego, CA (US); Rakesh Sanam, Rancho Santa Fe, CA (US); Chia-Yuan Teng, San Diego, CA (US); Chinchuan Chiu, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/109,009

(22) Filed: Dec. 1, 2020

(65) Prior Publication Data

US 2021/0337117 A1    Oct. 28, 2021

Related U.S. Application Data

(60) Provisional application No. 63/016,223, filed on Apr. 27, 2020.

(51) Int. Cl.
*H04N 5/232* (2006.01)
*G06F 1/16* (2006.01)

(52) U.S. Cl.
CPC ... *H04N 5/23229* (2013.01); *H04N 5/232933* (2018.08); *G06F 1/1605* (2013.01); *G06F 1/1626* (2013.01)

(58) Field of Classification Search
CPC ........ H04N 5/23229; H04N 5/232933; H04N 5/23227; G06F 1/1605; G06F 1/1626
See application file for complete search history.

(56) References Cited

U.S. PATENT DOCUMENTS

| | | | |
|---|---|---|---|
| 2011/0293239 A1* | 12/2011 | Tomidokoro | H04N 5/772 386/230 |
| 2014/0368719 A1* | 12/2014 | Kaneko | H04N 5/23296 348/333.02 |
| 2017/0331978 A1* | 11/2017 | Takahashi | H04N 1/32475 |
| 2021/0059622 A1* | 3/2021 | Fukuda | A61B 6/502 |

* cited by examiner

*Primary Examiner* — Hung H Lam
(74) *Attorney, Agent, or Firm* — Polsinelli LLP

(57) ABSTRACT

Techniques and systems are provided for processing image data. For example, an image signal processor can obtain (e.g., from a host processor) a first setting change indicator value indicating a change in parameter settings of the image signal processor. The image signal processor can obtain an image frame from an image sensor, and can determine a second setting change indicator value from the image frame. The second setting change indicator value can be provided to the image sensor from the host processor. The second setting change indicator value indicates a change in parameter settings of the image sensor. The image signal processor can compare the first setting change indicator value to the second setting change indicator value, and can determine whether to process the image frame or to drop the image frame based on comparing the first setting change indicator value to the second setting change indicator value.

30 Claims, 13 Drawing Sheets

SYNCHRONIZATION MECHANISM FOR IMAGE CAPTURE AND PROCESSING SYSTEMS

CROSS-REFERENCE TO RELATED APPLICATIONS

This application claims the benefit of U.S. Provisional Application No. 63/016,223, filed Apr. 27, 2020, which is hereby incorporated by reference, in its entirety and for all purposes.

FIELD

This application is related to image processing. In some examples, aspect of this application relate to systems, apparatuses, methods, and computer-readable media providing a synchronization mechanism for image capture and processing systems.

BACKGROUND

Cameras can be configured with a variety of image capture and image processing settings to alter the appearance of an image. Some camera settings are determined and applied before or during capture of the photograph, such as ISO, exposure time, aperture size, f/stop, shutter speed, focus, and gain. Other camera settings can configure post-processing of a photograph, such as alterations to contrast, brightness, saturation, sharpness, levels, curves, or colors. A host processor (HP) can be used to configure settings of an image sensor and/or settings of an image signal processor (ISP). The configuration of settings between the image sensor and the ISP should be synchronized to ensure images are properly processed.

SUMMARY

Systems and techniques are described herein for providing a synchronization mechanism for image capture and processing systems. According to one illustrative example, a method of processing image data is provided. The method includes: obtaining, by an image signal processor, a first setting change indicator value indicating a change in parameter settings of the image signal processor; obtaining, by the image signal processor, an image frame from an image sensor; determining, from the image frame, a second setting change indicator value indicating a change in parameter settings of the image sensor; comparing the first setting change indicator value to the second setting change indicator value; and determining, based on comparing the first setting change indicator value to the second setting change indicator value, whether to process the image frame or to drop the image frame.

In another example, an apparatus for processing image data is provided that includes a memory configured to store at least one image and one or more processors implemented in circuitry and coupled to the memory. The one or more processors are configured to and can: obtain, by an image signal processor, a first setting change indicator value indicating a change in parameter settings of the image signal processor; obtain, by the image signal processor, an image frame from an image sensor; determine, from the image frame, a second setting change indicator value indicating a change in parameter settings of the image sensor; compare the first setting change indicator value to the second setting change indicator value; and determine, based on comparing the first setting change indicator value to the second setting change indicator value, whether to process the image frame or to drop the image frame.

In another example, a non-transitory computer-readable medium is provided that has stored thereon instructions that, when executed by one or more processors, cause the one or more processor to: obtain, by an image signal processor, a first setting change indicator value indicating a change in parameter settings of the image signal processor; obtain, by the image signal processor, an image frame from an image sensor; determine, from the image frame, a second setting change indicator value indicating a change in parameter settings of the image sensor; compare the first setting change indicator value to the second setting change indicator value; and determine, based on comparing the first setting change indicator value to the second setting change indicator value, whether to process the image frame or to drop the image frame.

In another example, an apparatus for processing image data is provided. The apparatus includes: means for obtaining, by an image signal processor, a first setting change indicator value indicating a change in parameter settings of the image signal processor; means for obtaining, by the image signal processor, an image frame from an image sensor; means for determining, from the image frame, a second setting change indicator value indicating a change in parameter settings of the image sensor; means for comparing the first setting change indicator value to the second setting change indicator value; and means for determining, based on comparing the first setting change indicator value to the second setting change indicator value, whether to process the image frame or to drop the image frame.

In some aspects, the method, apparatuses, and computer-readable medium described above further comprise: determining, based on comparing the first setting change indicator value to the second setting change indicator value, that the first setting change indicator value and the second setting change indicator value match; and processing the image frame based on determining that the first setting change indicator value and the second setting change indicator value match.

In some aspects, the method, apparatuses, and computer-readable medium described above further comprise: determining, based on comparing the first setting change indicator value to the second setting change indicator value, that the first setting change indicator value and the second setting change indicator value do not match; and dropping the image frame based on determining that the first setting change indicator value and the second setting change indicator value do not match, wherein the image frame is not processed by the image signal processor when the image frame is dropped.

In some aspects, the first setting change indicator value is received by the image signal processor from a host processor. In some aspects, the second setting change indicator value is provided to the image sensor from the host processor.

In some aspects, the method, apparatuses, and computer-readable medium described above further comprise: receiving, by the image signal processor from a host processor, information indicating the change in parameter settings of the image signal processor; and generating the first setting change indicator value based on receiving the information from the host processor.

In some aspects, the first setting change indicator value includes a mode update (MUP) command control parameter value. In some cases, the second setting change indicator value includes a number of bits of a virtual channel (VC) field of a packet of the image frame received from the image sensor. In some examples, the packet of the image frame is a frame start (FS) packet. In some examples, the number of bits of the VC field of the packet of the image frame is a least significant (LS) bit of the packet.

In some aspects, the first setting change indicator value includes a mode identifier control parameter value. In some cases, the second setting change indicator value includes a mode identifier embedded in a frame header of a packet of the image frame received from the image sensor.

In some aspects, the first setting change indicator value includes a mode identifier control parameter value. In some cases, the second setting change indicator value includes a mode identifier included in a packet of the image frame received from the image sensor. In some examples, the packet of the image frame is a frame start (FS) packet.

In some aspects, the apparatus comprises a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
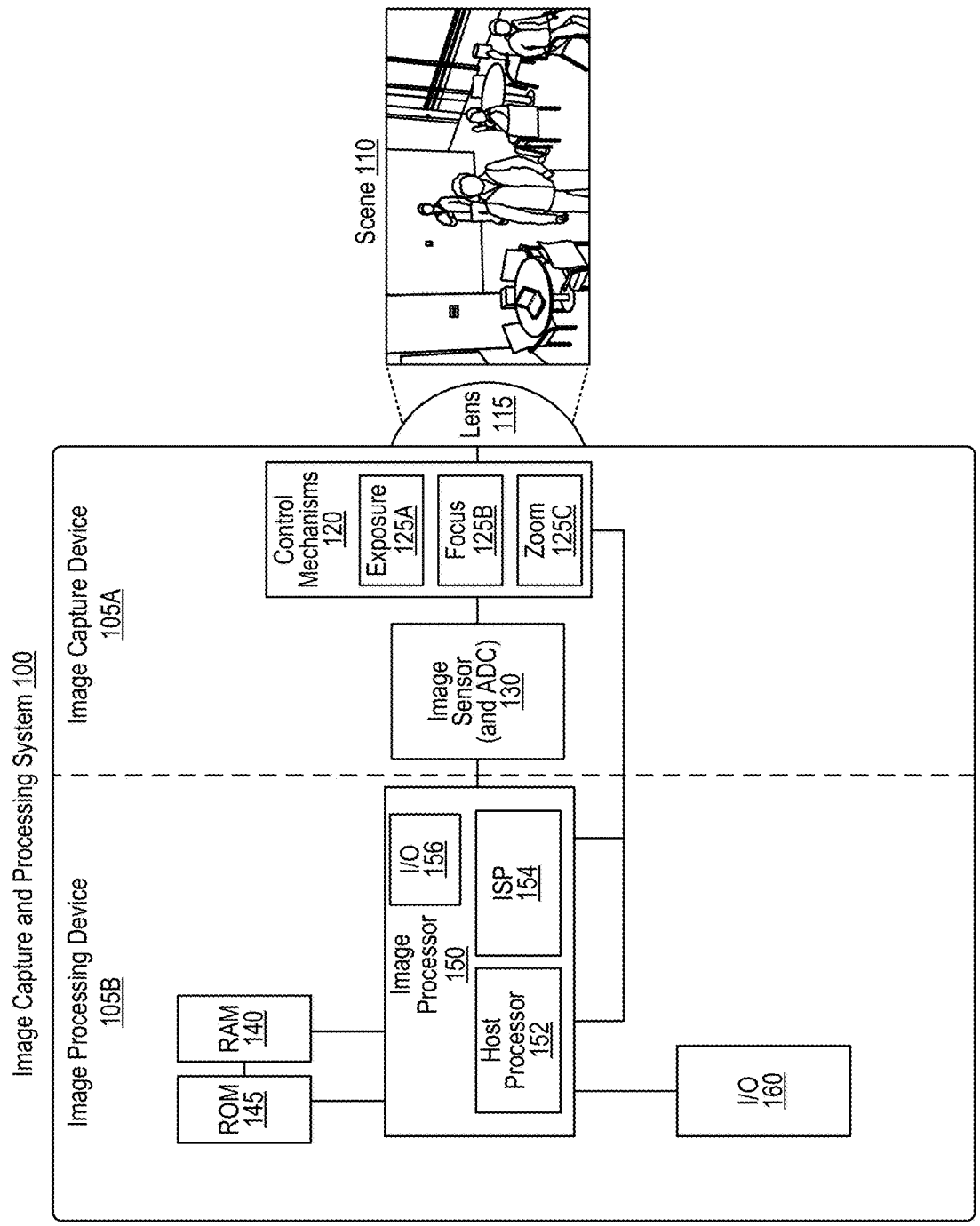
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras may include processors, such as image signal processors (ISPs), that can receive one or more image frames and process the one or more image frames. For example, a raw image frame captured by a camera sensor can be processed by an ISP to generate a final image. Processing by the ISP can be performed by a plurality of filters or processing blocks being applied to the captured image frame, such as denoising or noise filtering, edge enhancement, color balancing, contrast, intensity adjustment (such as darkening or lightening), tone adjustment, among others. Image processing blocks or modules may include lens/sensor noise correction, Bayer filters, de-mosaicing, color conversion, correction or enhancement/suppression of image attributes, denoising filters, sharpening filters, among others.

Cameras can be configured with a variety of image capture and image processing settings. Application of different settings can result in images with different appearances. Some camera settings are determined and applied before or during capture of the photograph, such as ISO, exposure time, aperture size, f/stop, shutter speed, focus, and gain. Other camera settings can configure post-processing of a photograph, such as alterations to contrast, brightness, saturation, sharpness, levels, curves, or colors.

In many camera systems, a host processor (HP) (also referred to as an application processor (AP) in some cases) is used to dynamically configure an image sensor with new parameter settings. The HP is also used to dynamically configure parameter settings of the ISP pipelines to match the exact settings of an input image sensor frame so that the image data is processed correctly. The configuration of settings between the image sensor and the ISP should be synchronized to ensure that images are properly processed and that the ISP and/or other components operate without interruption and/or failure. For example, as described in more detail below, synchronization between the image sensor and the ISP can be important to provide an operational image capture system that generates high quality images without interruption and/or failure.

Systems, apparatuses, processes, and computer-readable media are described herein for synchronizing the configuration of settings of an image sensor and an ISP. For instance, as described in more detail below, the systems and techniques can provide a closed-loop robust synchronization mechanism to support seamless image sensor mode switch data processing in an ISP.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 910 discussed with respect to the computing system 900. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/920, read-only memory (ROM) 145/925, a cache 912, a memory unit (e.g., system memory 915), another storage device 930, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 935, any other input devices 945, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

The host processor 152 can configure the image sensor 130 with new parameter settings (e.g., via an external control interface such as I2C, I3C, SPI, GPIO, and/or other interface). In one illustrative example, the host processor 152 can update exposure settings used by the image sensor 130 based on internal processing results of an exposure control algorithm from past image frames. The host processor 152 can also dynamically configure the parameter settings of the internal pipelines or modules of the ISP 154 to match the settings of one or more input image frames from the image sensor 130 so that the image data is correctly processed by the ISP 154. Processing (or pipeline) blocks or modules of the ISP 154 can include modules for lens (or sensor) noise correction, de-mosaicing, color conversion, correction or enhancement/suppression of image attributes, denoising filters, sharpening filters, among others. Each module of the ISP 154 may include a large number of tunable parameter settings. Additionally, modules may be co-dependent as different modules may affect similar aspects of an image. For example, denoising and texture correction or enhancement may both affect high frequency aspects of an image. As a result, a large number of parameters are used by an ISP to generate a final image from a captured raw image.

In some cases, the image sensor 130 can support dynamic switching between different operational modes that the image sensor 130 supports. Examples of the different operation modes include power off mode, software standby mode, stream on and off mode, among others. For instance, in stream operation mode, the image sensor is fully powered. With the stream operation on, the image sensor starts streaming image data (e.g., on the CSI-2 PHY layer port or interface). With the stream operation off, the image sensor stops streaming image data. In some cases, the host processor 152 can perform a dynamic parameter reconfiguration process that allows the image sensor 130 to support dynamic switching between the different operational modes without going through stream on and off and/or software standby procedures. Dynamic parameter reconfiguration refers to a process performed by the host processor 152 (e.g., an AP or other processor) to configure and update sensor internal register settings on-the-fly (e.g., as the operational modes change) without powering off the image sensor 130 and then powering on or putting the image sensor 130 into a software standby mode. Software standby mode refers to an operational mode of the image sensor 130 where the image sensor 130 is powered on and the camera control interface (CCI) communication is operational, but the image sensor 130 cannot capture and stream image data (e.g., on the CSI bus).

Such dynamic switching can reduce latency of mode switching processing and can improve user experience. Examples of the image sensor 130 dynamically switching between different operational modes include switching between turning high dynamic range (HDR) on and off, switching between a different number of exposures, switching between turning binning on and off (e.g., generating a 12 megapixel (MP) image using a 2×2 Quad Color Filter Array (QCFA) when binning is on and generating a 48 MP image by remosaicing the QCFA to a Bayer color filter array (CFA) when binning is off), among others.

Switching between operational modes (referred to as mode-switching scenarios) is different than changing image capture settings (referred to as non-mode-switching scenarios). For example, modifying image capture settings (e.g., exposure, focus, etc.) can result in a modification of how an image is captured and/or processed by the image sensor 130 and/or the ISP 154 (e.g., resulting in a brighter image, an image with a particular object in focus, etc.). However, if a setting of the image sensor 130 is incorrect or the image sensor 130 and/or ISP 154 are late in applying a setting in a non-mode-switching scenario, the result will be that a captured image is captured and/or processed with slight loss of quality in the processed image (e.g., without the intended settings, such as the image being slightly darker than intended, with an object slightly more out of focus than intended, etc.). However, when switching between operational modes in a mode-switching scenario (e.g., from HDR off to HDR on), applying the incorrect settings can result in a system failure, such as system hang or freeze, which can require a hardware reset of the ISP 154 and/or other components of the image capture and processing system 100. For instance, if the ISP 154 is unaware of the correct settings of an image frame produced by the image sensor 130 and mistakenly applies erroneous settings or parameters on that image frame for internal pipeline processing, the ISP 154 may freeze and require a hardware reset. As a result, instead of outputting an image frame with reduced quality, the image capture and processing system 100 may have to temporarily shut down and restart (e.g., the display screen may show a blank screen while the system 100 resets).

Figure 2:
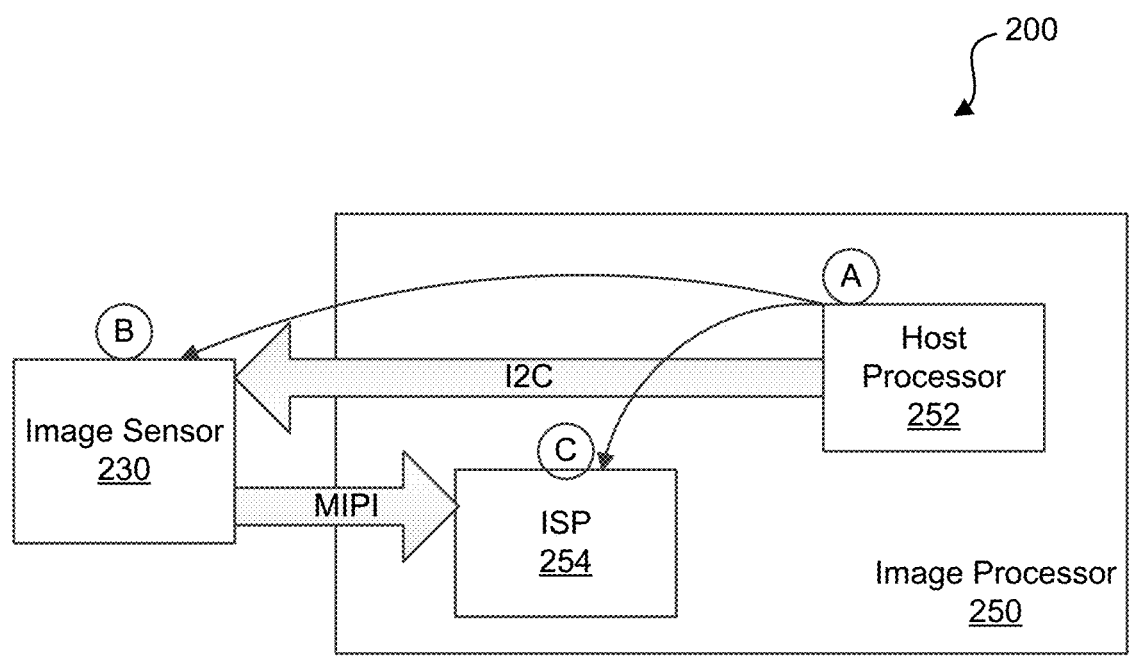
FIG. 2 is a block diagram illustrating an example of interactions between components of an image capture and processing system.
Figure 2:
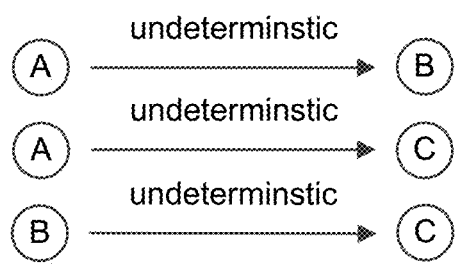

Synchronization between the image sensor 130 and the ISP 154 is important in order to provide an operational image capture system that generates high quality images without interruption and/or failure. FIG. 2 is a block diagram illustrating an example of an image capture and processing system 200 including an image processor 250 (including host processor 252 and ISP 254) in communication with an image sensor 230. The configuration shown in FIG. 2 is illustrative of traditional synchronization techniques used in camera systems. In general, the host processor 252 attempts to provide synchronization between the image sensor 230 and the ISP 254 using fixed periods of time by separately communicating with the image sensor 230 and the ISP 254. For example, in traditional camera systems, the host processor 252 communicates with the image sensor 230 (e.g., over an I2C port) and programs the image sensor 230 parameters with a first fixed period of time, such as 2-frame periods ahead of when that image frame will be processed by the ISP 254. The host processor 252 communicates with the ISP 254 (e.g., over an internal AHB bus or other interface) and programs the ISP 254 parameter settings with a second fixed period of time, such as 1-frame period ahead of when that image frame will be processed by the ISP 254.

The image sensor 230 can send image frames to the ISP 254 (B-to-C in FIG. 2), such as over an MIPI CSI-2 PHY port or interface, or other suitable interface. However, the communication between the host processor 252 and the image sensor 230 (shown as from A to B) is undeterministic. Similarly, the communication between the image sensor 230 and the ISP 254 (shown as from B to C) and the communication the host processor 252 and the ISP 254 (shown as from A to C) are also undeterministic. For example, there can be varying latencies in programming of the image sensor 230 and the ISP 254 by the host processor 252, which can result in a parameter settings mismatch between the sensor and the ISP. The latencies can be due to high CPU usage, congestion in one or more I/O ports, and/or due to other factors. Problems associated with mismatched parameters between the image sensor 230 and the ISP 254 based on such communications are described below with respect to FIG. 3A and FIG. 3B.

Figure 3A:
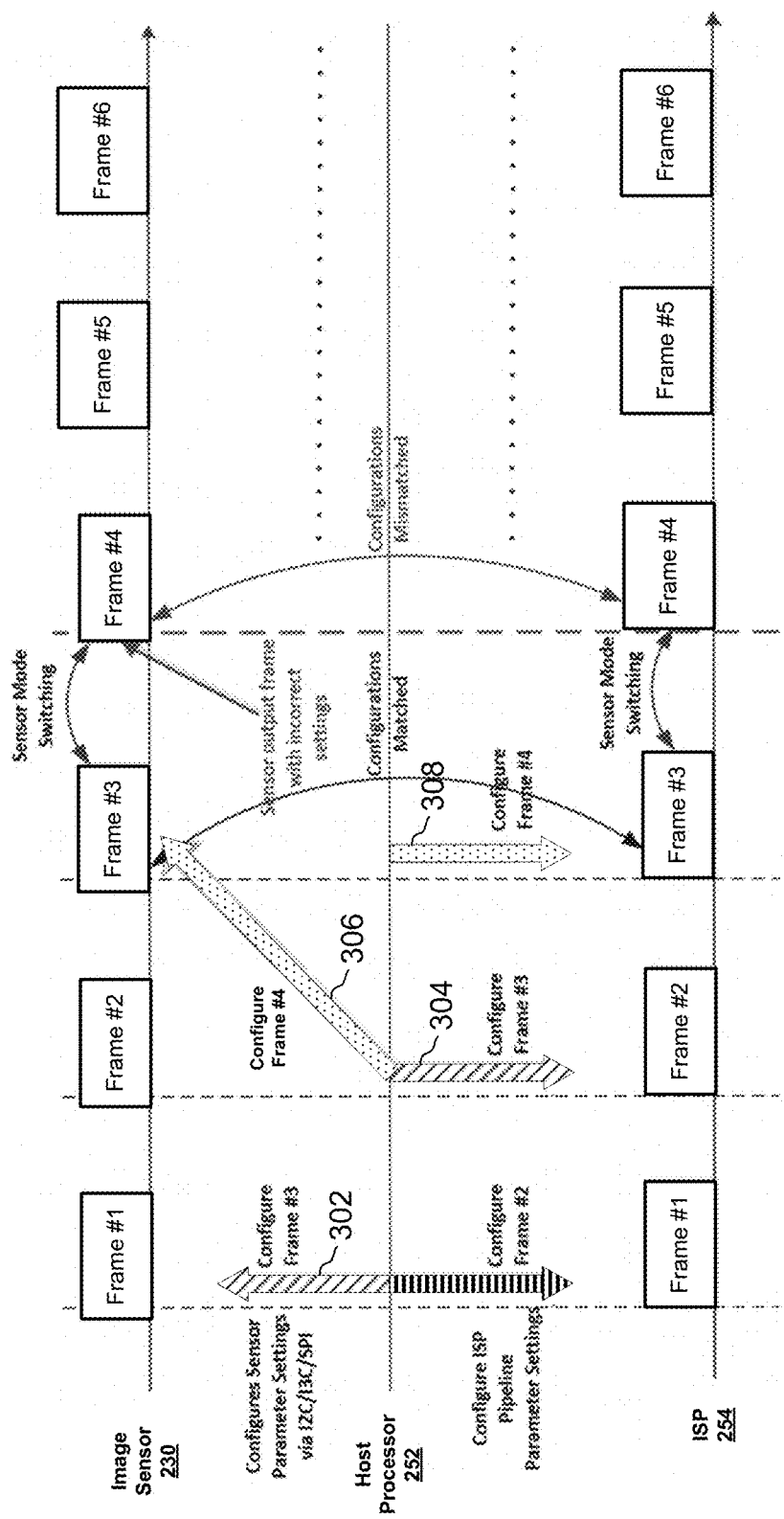
FIG. 3A is a conceptual diagram illustrating operations of a host processor, an image sensor, and an image signal processor (ISP) with respect to various image frames, in accordance with some examples.
Figure 3B:
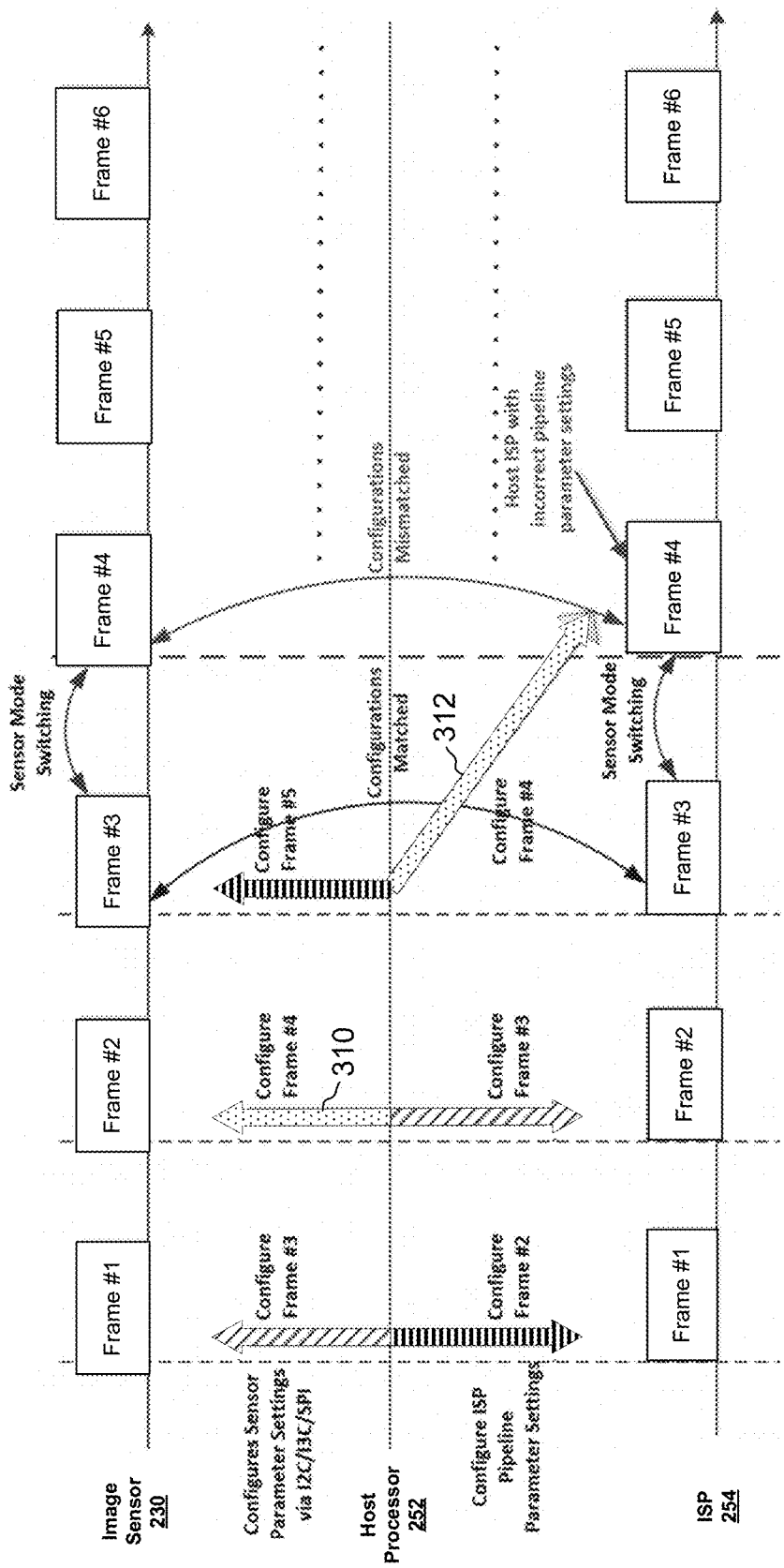
FIG. 3B is a conceptual diagram illustrating operations of a host processor, an image sensor, and an ISP with respect to various image frames, in accordance with some examples.

FIG. 3A and FIG. 3B are diagrams illustrating operations of the host processor 252, the image sensor 230, and the ISP 254 with respect to various image frames. The frame numbers shown in FIG. 3A and FIG. 3B are captured and processed in sequential order. For example, frame #1 is captured by the image sensor and processed by the ISP before frame #2, frame #2 is captured and processed before frame #3, and so on. As shown in FIG. 3A and FIG. 3B with arrows including diagonal patterns (the arrow 302 from the host processor 252 to the image sensor 230 at frame #1 and the arrow 304 from the host processor 252 to the ISP 254 at frame #2), in order to achieve matching parameter settings between the image sensor 230 and the ISP 254 at input frame #3, the host processor 252 programs the image sensor 230 parameter settings for frame #3 during the input frame #1 period (the period during which frame #1 is being captured and sent from the image sensor 230 to the ISP 254 for processing) and programs the ISP 254 parameter settings for processing frame #3 during the input frame #2 period (the period during which frame #2 is being captured and sent from the image sensor 230 to the ISP 254 for processing).

The time periods can allow the parameter settings to be fully applied before the frame is captured by the image sensor 230 and processed by the ISP 254. A goal of the synchronization is that, by the time frame #3 is captured by the image sensor and processed by the ISP, the settings of the image sensor 230 and the ISP 254 are aligned. However, latencies experienced when the host processor 252 is programming the image sensor 230 and the ISP 254 can vary and are not fixed (e.g., they are undeterministic as described above with respect to FIG. 2), which can result in a parameter settings mismatch between the sensor and the ISP. For example, as shown in FIG. 3A by the arrows with dotted patterns (the diagonal arrow 306 from the host processor 252 at the frame #2 period to the image sensor 230 at the frame #3 period and the arrow 308 from the host processor 252 to the ISP 254 at the frame #3 period), if the completion time for configuring the parameter settings of the image sensor 230 for frame #4 takes longer than the fixed 2-frame period, the output frame #4 from the image sensor 230 will have incorrect parameter settings and will not match the parameter settings of the ISP 254 pipelines for processing frame #4. In another example, as illustrated in FIG. 3B by the arrows with dotted patterns (the diagonal arrow 312 from the host processor 252 at the frame #3 period to the ISP 254 at the frame #4 period and the arrow 310 from the host processor 252 to the image sensor 230 at the frame #2 period), if the completion time for configuring the parameters settings of the ISP 254 for frame #4 takes longer than the fixed 1-frame period, a mismatch will occur between the settings of the image sensor 230 and the settings of the ISP 254. In such an example, the ISP 254 will use incorrect parameter settings to process the input frame #4.

The problems associated with mismatched parameters between the image sensor and the ISP are present in mode-switching scenarios and in non-mode-switching scenarios. The mismatch becomes even more problematic in mode-switching scenarios, as described above. For example, in both of the two mismatch scenarios shown in FIG. 3A and FIG. 3B, the camera system (e.g., the ISP 254, the host processor 252, and/or other component(s) of the image capture and processing system 200) can hang or freeze if the image sensor 230 is also performing dynamic mode switching (as illustrated in FIG. 3A and FIG. 3B between frame #3 and frame #4).

As noted above, systems, processes (also referred to as methods), devices, and computer-readable media (referred to herein as "systems and techniques") are described that can provide synchronization between the configuration of settings of an image sensor (e.g., image sensor 130 and/or the image sensor 230) and parameters and/or settings of an ISP (e.g., the ISP 154 and/or the ISP 254). The systems and techniques can provide synchronization between the image sensor and the ISP in mode-switching scenarios and in non-mode-switching scenarios. With respect to mode switching scenarios, the systems and techniques provide a robust synchronization mechanism between the image sensor and the ISP to support seamless switching between modes (e.g., between HDR on and HDR off and vice versa, between binning on and binning off and vice versa, among other mode switching scenarios) and to eliminate camera system hang during the mode switching scenarios.

Figure 4:
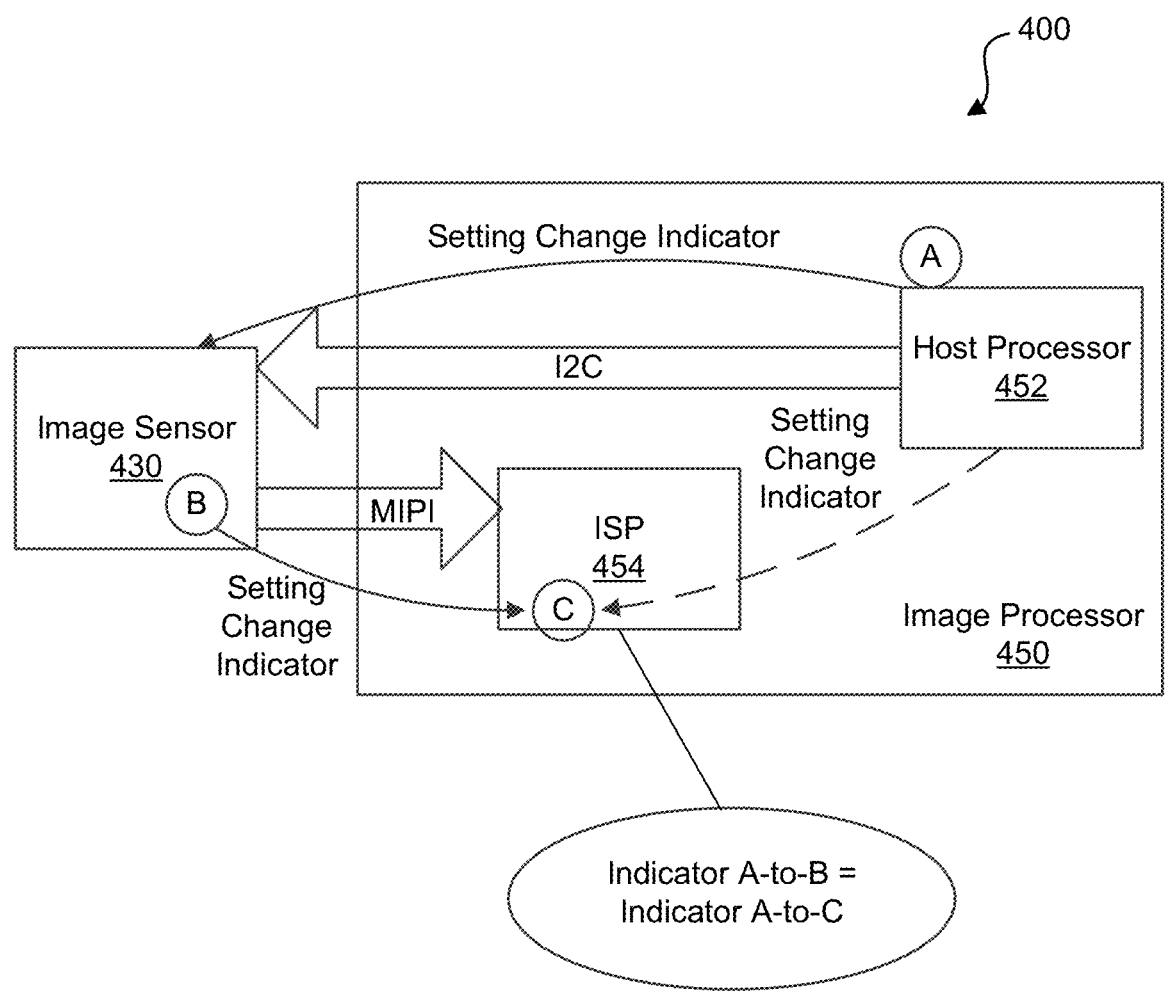
FIG. 4 is a block diagram illustrating another example of interactions between components of an image capture and processing system, in accordance with some examples.

FIG. 4 is a block diagram illustrating an example of an image capture and processing system 400. An image processor 450 is in communication with an image sensor 430. The image processor 450 includes a host processor 452 and an ISP 454. The image capture and processing system 400 can operate to synchronize the configuration of settings of the image sensor 430 and settings of the ISP 454. For instance, one or more setting change indicator values can be used to synchronize the configuration of settings of the image sensor 430 and the ISP 454.

In some examples, as shown in FIG. 4, the host processor 452 can communicate a setting change indicator value to the image sensor 430 and can communicate a setting change indicator value to the ISP 454 when configuring the image sensor 430 with new settings (e.g., in a non-mode-switching scenario) or when configuring the image sensor 430 with a new operational mode (in a mode-switching scenario). The host processor 452 can communicate the setting change indicator value to the image sensor 430 over an I2C port or other type of interface port. The host processor 452 can communicate the setting change indicator value to the ISP 454 over an AHB bus or other type of interface or port. In some examples, the host processor 452 can begin configuring the image sensor 430 with new settings, and the image sensor 430 can generate a value for the setting change indicator in response to the host processor 452 configuring the image sensor 430. In some examples, the host processor 452 can begin configuring the ISP 454 with new settings that correspond with the new settings with which the image sensor 430 are configured, and the ISP 454 can generate a value for the setting change indicator in response to the host processor 452 configuring the ISP 454.

In some implementations, the setting change indicator can represent particular settings or a particular operational mode. For instance, different setting change indicator values can represent different sensor operational modes. In some implementations, the setting change indicator can provide an indication to the image sensor 430 and the ISP 454 that the image sensor 430 has undergone a settings change (e.g., one or more settings have been updated in a non-mode-switching scenario or the image sensor 430 is operating under a different operational mode in a mode-switching scenario). For instance, a setting change indicator value can indicate that a change in settings has occurred or that a change in a sensor operational mode has occurred.

Once the image sensor is configured with the new settings or operational mode, the image sensor 430 outputs image frames that are captured using the new settings or operational mode along with the new parameter setting indicator provided by the host processor 452. The ISP 454 can obtain an image frame from the image sensor 430 and can determine the parameter setting indicator included with the image frame. The ISP 454 can compare the parameter setting indicator included with the frame to the parameter setting indicator the ISP 454 received from the host processor 452 to determine whether the values of two parameter setting indicator values match. The values of the parameter setting indicators need to match for the ISP 454 to start processing the input image frame. For example, if there is a delay in updating the image sensor 430 with new mode parameters settings, the ISP 454 can detect a mismatch in the parameter setting indicator values for a given image frame from the image sensor 430, and can drop the image frame without processing the image frame. By dropping the image frame, a potential system hang or freeze can be avoided. In another example, the ISP 454 can detect a mismatch in parameter setting indicator values and can drop the input frame when there is a delay in updating the ISP with new mode parameter settings.

In some implementations, the image sensor 430 can implement a grouped parameter hold scheme to guard the update of parameter settings (e.g., the update of mode change parameter settings). For example, a host software programmable grouped parameter hold register bit can be defined to control when changes of internal parameters take effect. When the grouped parameter hold register is written to 1, the image sensor 430 will hold (or postpone) changes of all subsequent parameters from taking effect. The host processor 452 can write a value of 1 to the grouped parameter hold register the host processor 452 begins programming the image sensor with new settings, which indicates to the image sensor to hold all parameter settings until the register is written to a value of 0. When the grouped parameter hold register is written to 0 (e.g., the host processor 452 sends a value of 0 for the register), the sensor internal hold state will be cleared, and all changes of parameters after the hold was initially set will take effect simultaneously on the frame boundary (e.g., for all packets that below to a frame, which can be designated using a frame start (FS) packet and a frame end (FE) packet). In some cases, a value of 0 for the grouped parameter hold register can correspond to the hold state, and a value of 1 for the grouped parameter hold register can correspond to the release or cleared state.

Figure 5A:
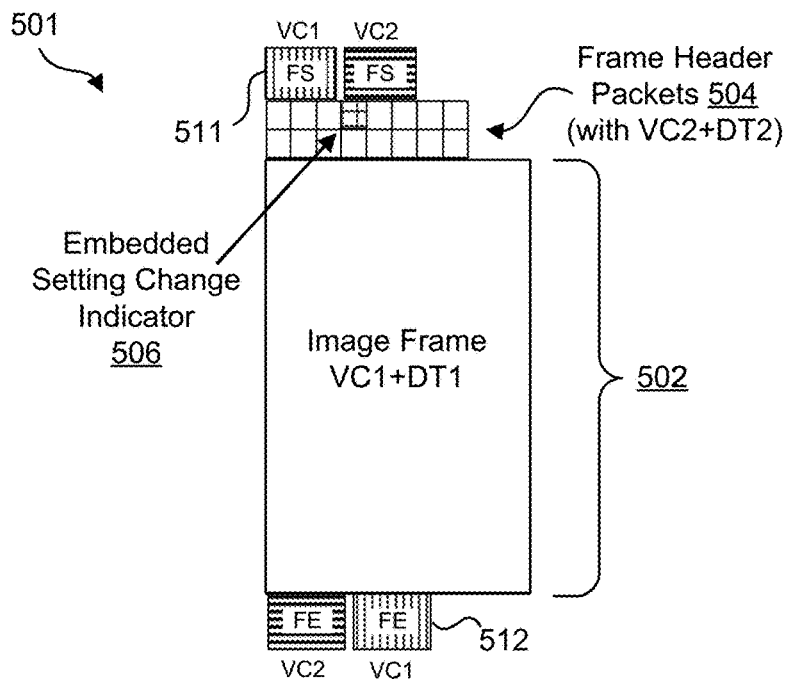
FIG. 5A is a conceptual diagram illustrating an example of an image frame with frame header packets including an embedded setting change indicator value, in accordance with some examples.
Figure 5B:
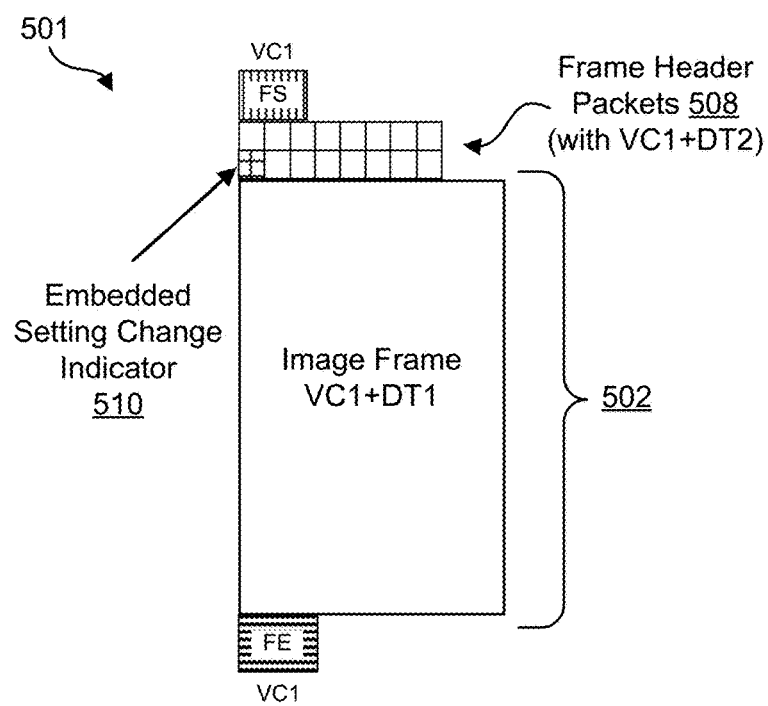
FIG. 5B is a conceptual diagram illustrating another example of an image frame with frame header packets including an embedded setting change indicator value, in accordance with some examples.

In some examples, the image sensor 430 can include a setting change indicator value as special frame header packets along with the image frame packets. In such examples, the ISP 454 can also add a new setting change indicator value (e.g., a mode identifier (ID) control parameter). In some cases, the new setting change indicator value added by the ISP 454 can include a new host processor software programmable control register (e.g., flip-flops (FFs)) stored inside the ISP 454. FIG. 5A and FIG. 5B are diagrams illustrating examples of different configurations of an image frame 501 with frame header packets including an embedded setting change indicator value. As shown in FIG. 5A and FIG. 5B, the image sensor 430 can add frame header packets 504 (FIG. 5A) or frame header packets 508 (FIG. 5B) before image frame packets 502. In the example of FIG. 5A and FIG. 5B, a setting change indicator is embedded in the frame header packets. In FIG. 5A, the frame header packets 504 include the embedded setting change indicator 506 for the image frame 501. In FIG. 5B, the frame header packets 508 include the embedded setting change indicator 510 for the image frame 501. The setting change indicator (e.g., the setting change indicator 506 and/or the setting change indicator 510) can include a stream tag or mode ID information for the image frame 501. For example, different stream tag or mode IDs can represent different operational modes for the image sensor 430.

As noted above, a MIPI interface or port (e.g., a MIPI CSI-2 PHY interface) can be used for communications between the image sensor 430 and the ISP 454. The MIPI CS-2 Specification defines virtual channels (VCs) and data types (DTs). A VC can be identified by a 4- or 5-bits VC identifier, which can be included in a VC field of a packet (e.g., in a frame start (FS) packet). The 4- or 5-bit VC identifier can provide a means for designating separate logical channels for different data flows that are interleaved in the data stream. The ISP 454 can extract one or more VC identifiers from a packet headers of image frames and can de-multiplex the interleaved data streams to the appropriate channel based on the VC identifiers. According to the MIPI CS-2 Specification, a maximum of N data streams is supported, where N=16 or 32, respectively, for D-PHY or C-PHY physical layer options. Valid channel identifiers are 0 to N−1. The VC identifiers in peripherals can be programmable to allow a host processor to control how the data streams are de-multiplexed. A DT value specifies the format and content of payload data. According to the MIPI CS-2 Specification, a maximum of sixty-four data types are supported.

The MIPI CS-2 Specification also specifies that each image frame will begin with a Frame Start (FS) Packet containing a Frame Start Code data type (e.g., designated as date type 0x00). The FS Packet is followed by one or more long packets containing image data and zero or more short packets containing synchronization codes. Each image frame ends with a Frame End (FE) Packet containing a Frame End Code data type (e.g., designated as date type 0x01).

In some examples when a MIPI interface is used between the image sensor 430 and the ISP 454, the frame header packets can use the same MIPI CSI-2 virtual channel (VC) but a different data type (DT) (e.g., such as an embedded data type 0x12) defined by the MIPI CSI-2 Specification. For example, as shown in FIG. 5B, the image frame packets 502 use virtual channel 1 (VC1) and data type 1 (DT1), and the frame header packets 508 use the VC1 and a data type 2 (DT2). In such examples, the frame 501 will be associated with one FS packet and one FE packet, as shown in FIG. 5B. In some examples, the frame header packets can different a VC and DT from the VC and DT used in the associated image frame packets. For example, as shown in FIG. 5A, the image frame packets 502 use VC1 and DT1, and the frame header packets 504 use a virtual channel 2 (VC2) and DT2.

In such examples, the frame 501 will be associated with two FS packets and two FE packets, as shown in FIG. 5A.

Figure 5C:
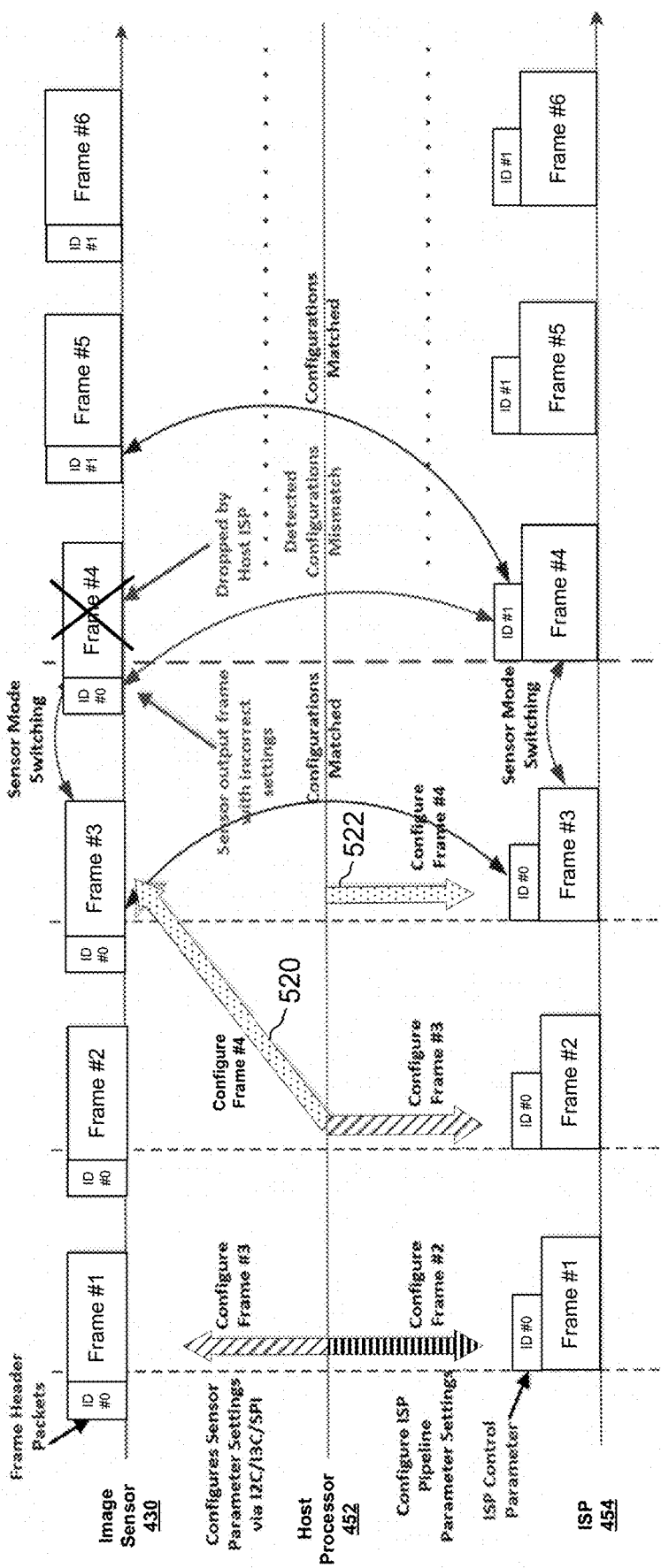
FIG. 5C is a conceptual diagram illustrating operations of a host processor, an image sensor, and an ISP with respect to various image frames, in accordance with some examples.

FIG. 5C is a diagram illustrating operations of the host processor 452, the image sensor 430, and the ISP 454 with respect to various image frames. The image frames in FIG. 5C can include the frame configuration shown in FIG. 5A or FIG. 5B. As shown in FIG. 5C, the host processor 452 programs sensor parameters with new mode parameter settings including a new mode ID #1 for frame #4 during the input frame #2 period. The host processor 452 programs the ISP 454 pipeline parameter settings with a new mode ID #1 for processing frame #4 during input frame #3 period.

As noted above, the image sensor 430 can implement a grouped parameter hold mechanism in order to determine when an update to parameter settings (e.g., mode change parameter settings) will be applied to a given image frame. For instance, the image sensor 430 can define a host software programmable grouped parameter hold register bit to control when changes of the internal parameters will take effect. When the grouped parameter hold register is written to a value of 1, the image sensor 430 will postpone or hold changes of all subsequent parameters from taking effect until the register is subsequently written to a value of 0. For example, when the grouped parameter hold register is written to a value of 0, the internal hold state of the image sensor 430 will be cleared, and all the changes of the parameters after the hold was initially set will take effect simultaneously on the frame boundary. Referring to FIG. 5A, the frame boundary can be defined by the FS packet 511 and the FE packet 512. When the ISP 454 receives the FS packet 511, the ISP 454 can determine that a next packet will be part of a new frame 501 (e.g., a header packet or a frame packet). When the ISP 454 receives the FE packet 512, the ISP 454 can determine that all packets for the frame 501 have been previously received.

Referring again to FIG. 5C, the ISP 454 can decode the frame header packets (e.g., frame header packets 504 or frame header packets 508) of image frames received from the image sensor 430. Based on decoding the frame header packets of an image frame, the ISP 454 can extract a value of the setting change indicator (e.g., setting change indicator 506 or setting change indicator 510, which can include mode ID or other indicator) for the input image frame. The ISP 454 can compare the setting change indicator value extracted from the input frame with a setting change indicator value currently stored or maintained by the ISP 454 (e.g., a mode ID control parameter stored by the ISP). The ISP 454 may begin processing the input image frame if (e.g., only if) the values of two setting change indicator match (e.g., the two mode IDs are equal). For example, if the ISP 454 determines that the value of the setting change indicator extracted from the image frame matches (has the same value as) the setting change indicator value stored by the ISP 454, the ISP 454 will begin processing the image frame.

However, if the ISP 454 determines that the value of the setting change indicator extracted from the image frame does not match (does not have the same value as) the setting change indicator value stored by the ISP 454, the ISP 454 can drop the image frame and not process the image frame. Such a situation can occur if the host processor 452 is delayed in updating the image sensor 430 with new mode parameters settings. For example, as shown in FIG. 5C by the arrows with the dotted patterns (the arrow 520 from the host processor 452 at the frame #2 period to the image sensor 430 at the frame #3 period and the arrow 522 from the host processor 452 at the frame #3 period to the ISP 454 at the frame #3 period), the image sensor outputs frame #4 with incorrect parameter settings and an incorrect mode ID #0 (the mode ID #0 is incorrect and should be mode ID #1 for the new parameter settings) in the frame header packets. In such an example, the ISP 454 can detect a mismatch in the mode IDs and can drop the input frame #4 without processing to avoid potential system hang and/or other negative results. The next input frame #5 will have the correct setting change indicator value (with ID #1), in which case the ISP 454 will determine matching setting change indicator values and will process the input frame #5. In another example, there may be a delay in configuring the parameters of the ISP 454 and the ISP 454 may not have the most up-to-date mode ID (e.g., the ISP may have mode ID #0 currently stored as the setting change indicator value and the correct mode ID is mode ID #1). In such an example, the ISP 454 can detect a mismatch in the setting change indicator values (e.g., mode ID #0 does not equal mode ID #1) and can drop the input frame.

In some cases, to implement the technique described with respect to FIG. 5A-FIG. 5C, the image sensor 430 and the ISP 454 can support encoding (by the image sensor 430) and decoding (by the ISP 454) of the special frame header packets that include the setting change indicator values (e.g., the new mode IDs) whenever a setting or mode change occurs. In some cases, the setting change indicator values (e.g., different mode IDs) can be standardized so that a particular setting change indicator value corresponds to a particular setting configuration or mode parameter settings).

Figure 6A:
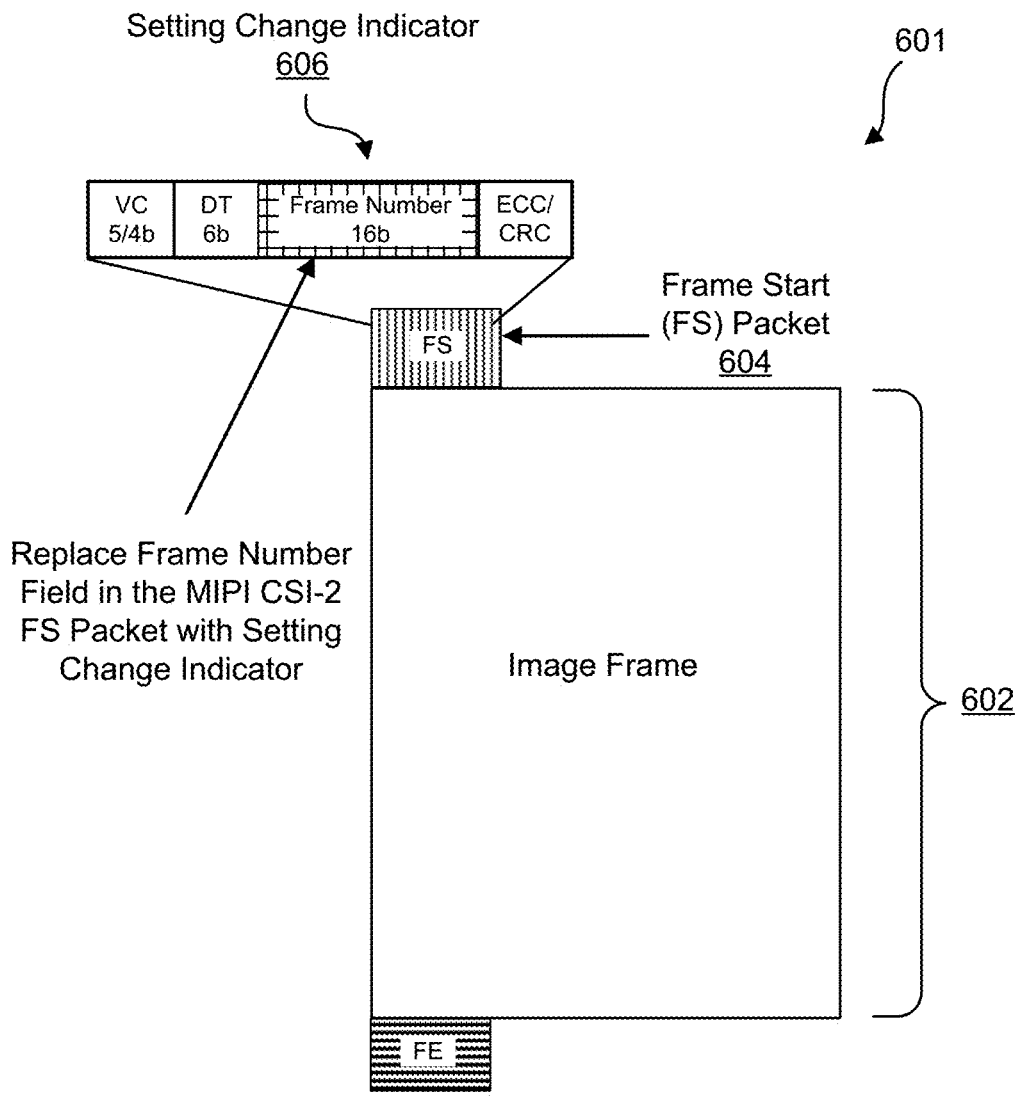
FIG. 6A is a conceptual diagram illustrating an example of an image frame with a frame start packet including a setting change indicator value, in accordance with some examples.

In some examples, the image sensor 430 can include a setting change indicator value in a portion of a beginning packet (e.g., a frame start (FS) packet) associated with an image frame. For instance, the image sensor 430 can send a MIPI CSI-2 standard FS packet prior to the image frame packets of the image frame. In such examples, the ISP 454 can also add a new setting change indicator value (e.g., a mode ID control parameter). As noted above, in some cases, the new setting change indicator value added by the ISP 454 can include a new host processor software programmable control register (e.g., flip-flops (FFs)) stored inside of the ISP 454. FIG. 6A is a diagram illustrating an example of a configuration of an image frame 601 with a FS packet 604 (including a setting change indicator 606) prior to image frame packets 602 of the image frame 601. The FS packet 604 can include a MIPI CSI-2 standard FS packet. In the example of FIG. 6A, the setting change indicator 606 (e.g., which can include a mode ID as described above) is added into the 16-bit frame number field of the FS packet 604. The setting change indicator 606 value can replace all or part of the 16-bits in the frame number field for representing the sensor settings or mode change information of the image frame 601. Use of some or all of the bits of the frame number field for the setting change indicator 606 can have a limited or no negative effect, as the frame number field of the FS packet 604 is not used in many implementations. In some examples, an additional field can be added to the FS packet 604 and the additional field can include the value of the setting change indicator 606.

Figure 6B:
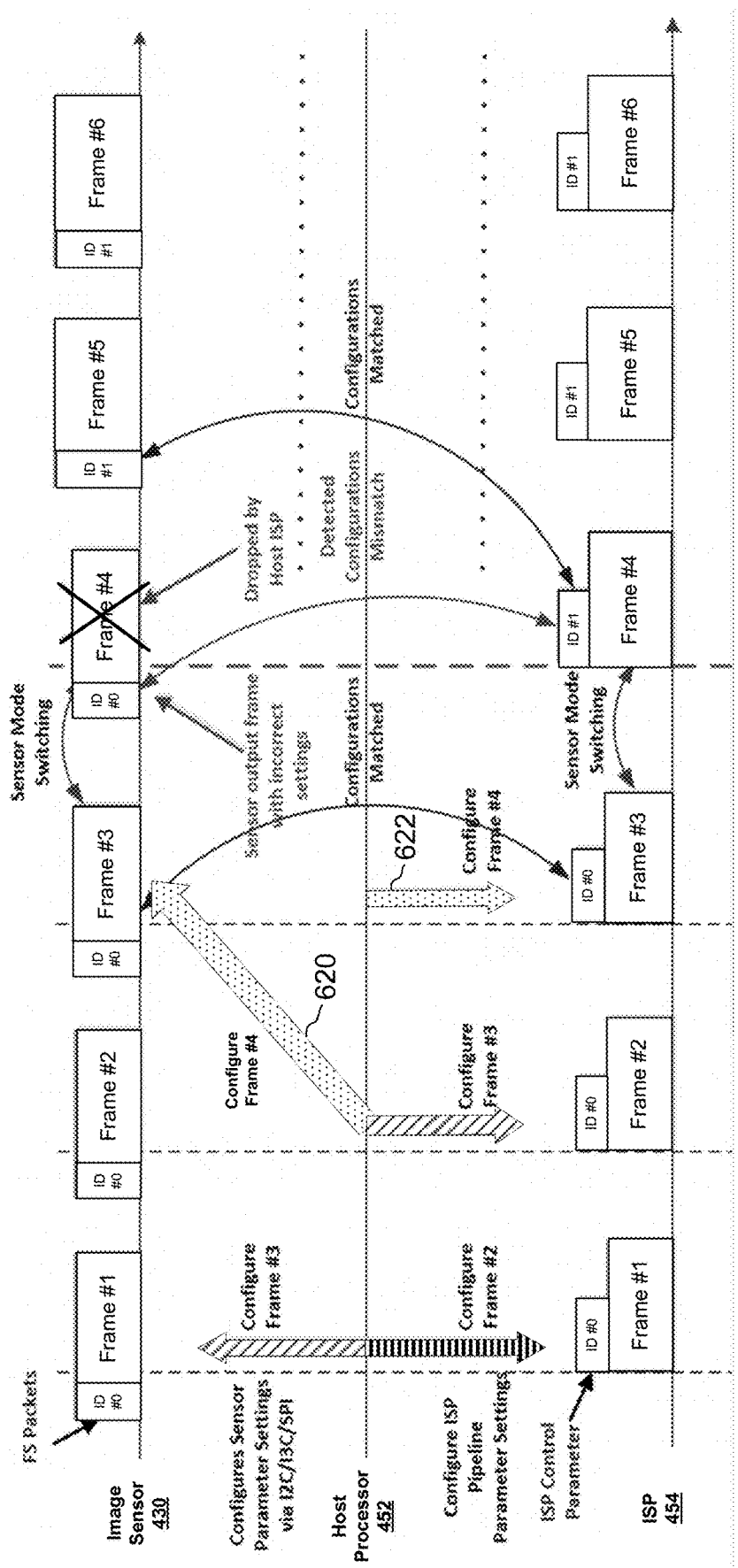
FIG. 6B is a conceptual diagram illustrating operations of a host processor, an image sensor, and an ISP with respect to various image frames, in accordance with some examples.

FIG. 6B is a diagram illustrating operations of the host processor 452, the image sensor 430, and the ISP 454 with respect to various image frames. The image frames in FIG. 6B can include the frame configuration shown in FIG. 6A. As shown in FIG. 6B, the host processor 452 programs parameters of the image sensor 430 with new mode parameter settings associated with a new mode ID #1 for frame #4 during the input frame #2 period. The host processor 452 programs the pipeline parameter settings of the ISP 454 (associated with the new mode ID #1) for processing frame

4 during input frame #3 period. As described above, the image sensor 430 can implement a grouped parameter hold mechanism in some cases to determine when an update to parameter settings (e.g., mode change parameter settings) will be applied to a given image frame. In such cases, when the grouped parameter is written from a value of 1 to a value of 0, the internal hold state of the image sensor 430 can be cleared and all parameter changes after the hold was implemented can be applied simultaneously on the frame boundary.

The ISP 454 can decode the FS packets (e.g., the FS packet 604) of image frames received from the image sensor 430. Based on decoding a FS packet of an image frame, the ISP 454 can extract a value of the setting change indicator (e.g., setting change indicator 606, which can include mode ID or other indicator) from the frame number field (or other field) of the FS packet. The ISP 454 can compare the setting change indicator value extracted from the FS packet with a setting change indicator value currently stored or maintained by the ISP 454 (e.g., a mode ID control parameter stored by the ISP). The ISP 454 will begin processing the input image frame if (e.g., only if) the values of two setting change indicator match (e.g., the two mode IDs are equal). For example, if the ISP 454 determines that the value of the setting change indicator extracted from the image frame matches (has the same value as) the setting change indicator value stored by the ISP 454, the ISP 454 will begin processing the image frame.

If the ISP 454 determines that the value of the setting change indicator extracted from the image frame does not match (does not have the same value as) the setting change indicator value stored by the ISP 454, the ISP 454 can drop the image frame and not process the image frame. As described above, a mismatch between setting change indicator values can occur if the host processor 452 is delayed in updating the image sensor 430 with new mode parameters settings. For example, as shown in FIG. 6B by the arrows with dotted patterns (the arrow 620 from the host processor 452 at the frame #2 period to the image sensor 430 at the frame #3 period and the arrow 622 from the host processor 452 at the frame #3 period to the ISP 454 at the frame #3 period), the image sensor 430 outputs frame #4 with incorrect parameter settings and an incorrect mode ID #0 (the mode ID #0 is incorrect and should be mode ID #1 for the new parameter settings) in the FS packet. In such an example, the ISP 454 can detect a mismatch in the mode IDs and can drop the input frame #4 without processing to avoid potential system hang and/or other negative results. The next input frame #5 will have the correct setting change indicator value (with ID #1), in which case the ISP 454 will determine matching setting change indicator values and will process the input frame #5. In another example, there may be a delay in configuring the parameters of the ISP 454 and the ISP 454 may not have the correct mode ID (e.g., the ISP may have mode ID #0 currently stored as the setting change indicator value and the correct mode ID is mode ID #1). In such an example, the ISP 454 can detect a mismatch in the setting change indicator values (e.g., mode ID #0 does not equal mode ID #1) and can drop the input frame.

The technique described with respect to FIG. 6A and FIG. 6B does not require the image sensor 430 to send the setting change indicator value (e.g., the mode ID) with special frame header packets. In some examples when the FS of the MIPI CSI-2 standard are used, to implement the technique described with respect to FIG. 6A and FIG. 6B, the image sensor 430 and the ISP 454 can support encoding (by the image sensor 430) and decoding (by the ISP 454) of non-standard mode IDs (or other setting change indicator values) to replace the MIPI CSI-2 standard frame number field defined in the FS packet whenever a setting or mode change occurs. In such implementations, the setting change indicator values (e.g., different mode IDs) can be standardized so that a particular setting change indicator value corresponds to a particular setting configuration or mode parameter settings).

In some examples, the image sensor 430 can include a setting change indicator value in a virtual channel or other logical channel field or portion of a packet (e.g., in a frame start (FS) packet) associated with an image frame. For example, a certain number of bits (e.g., 1-bit, 2-bits, etc.) of a virtual channel (VC) field of an FS packet can be used to indicate a setting change indicator value. In some examples, the FS packet can include a MIPI CSI-2 standard FS packet. As described below, the image sensor 430 can toggle between an odd number and an even number of VCs when a settings change or mode switching occurs. In such implementations, the ISP 454 can also add a mode update (MUP) command control parameter. The MUP command control parameter can include a single bit in some cases. In one illustrative example, a MUP value of 0 can be used to match with even VCs, and a MUP value of 1 can be used to match with odd VCs. The MUP command control parameter can be used to guard updates of the ISP 454 grouped frame parameter settings during mode switching, so that the correct ISP 454 parameters are applied to the correct image frames.

Figure 7A:
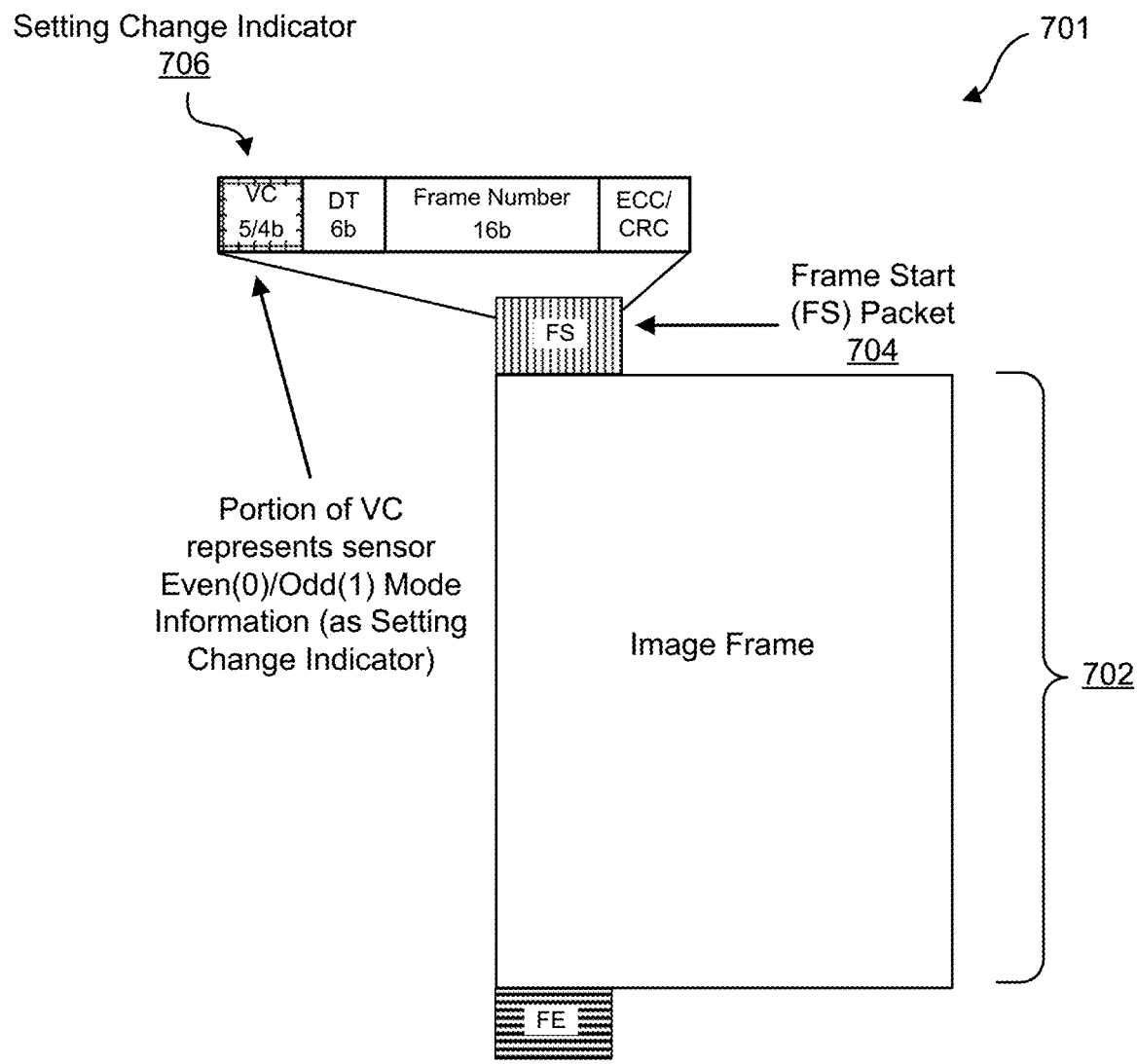
FIG. 7A is a conceptual diagram illustrating an example of an image frame with a frame start packet including a setting change indicator value, in accordance with some examples.

FIG. 7A is a diagram illustrating an example of a configuration of an image frame 701 with an FS packet 704 (including a setting change indicator 706) prior to image frame packets 702 of the image frame 701. According to the MIPI CSI-2 Specification, an FS packet includes a virtual channel (VC) field and in some cases a virtual channel extension (VCX) field indicating the designated VC of the FS packet. The VC field (the least significant two bits of the VC identifier) is contained in the two most-significant (MS) bits of a Data Identifier (DI) Byte of a MIPI packet (e.g., an FS packet) and the most significant two or three bits of the VC identifier are contained in the VCX field. As noted above, the VC field can have 4-bits or 5-bits. For instance, a 4-bit or 5-bit VC identifier can be included in the VC field to indicate a VC to which data (an image frame) belongs. The DI Byte also includes a Data Type (DT) field that is contained in the six least-significant (LS) bits of the DI Byte.

The VC field is denoted as "VC 5/4b" in FIG. 7A, where the 5/4b notation indicates the VC field can include 5 bits or 4 bits. The DT field is denoted in FIG. 7A as "DT 6b" (which includes 6 bits). A portion of the VC field can be used to represent the a setting change indicator value for the image frame 701. For instance, a portion of the VC field can represent settings or mode change information for the image sensor by indicating an even number of VCs or an odd number of VCs. In one illustrative example, the least significant (LS) bit of the VC field of the FS packet 704 can be used to represent sensor settings or sensor mode change information of an input image frame, and the remaining bits (e.g., the remaining MS bits) of the VC can still be used for indicating VC information. The image sensor 430 can toggle between an odd number (represented using a value of 1) and an even number (represented using a value of 0) of VCs when a settings change or mode switching occurs. For instance, if the VC fields of a number of image frames indicate an even number of VCs and then a mode switch is subsequently triggered prior to image frame 701 being captured, the image sensor 430 can send the FS packet 704 with an odd number of VCs once the image sensor 430 is configured with the settings associated with the mode switch.

As noted above, the ISP 454 can add a new single bit MUP command control parameter, where a MUP value of 0 is used to match with even VCs, and a MUP value of 1 is used to match with odd VCs. The MUP command control parameter value can be set when a settings change (in a non-mode-switching scenario) or mode-switching scenario occurs. For example, when the host processor 452 indicates to the ISP 454 that a switch in mode settings is going to be performed, the ISP 454 can store a new MUP command control parameter value (e.g., a value of 1 when the value of 0 was previously used). The ISP 454 can then wait until an input image frame with a matching VC number indicator (e.g., indicating either an odd number of VCs or an even number of VCs) is received from the image sensor 430 before processing any image frames from the image sensor 430. For example, if the MUP command control parameter value is a value of 1, the ISP 454 can wait until an image frame with a FS packet indicating an odd number of VCs (e.g., indicated by a value of 1) is received from the image sensor 430.

Figure 7B:
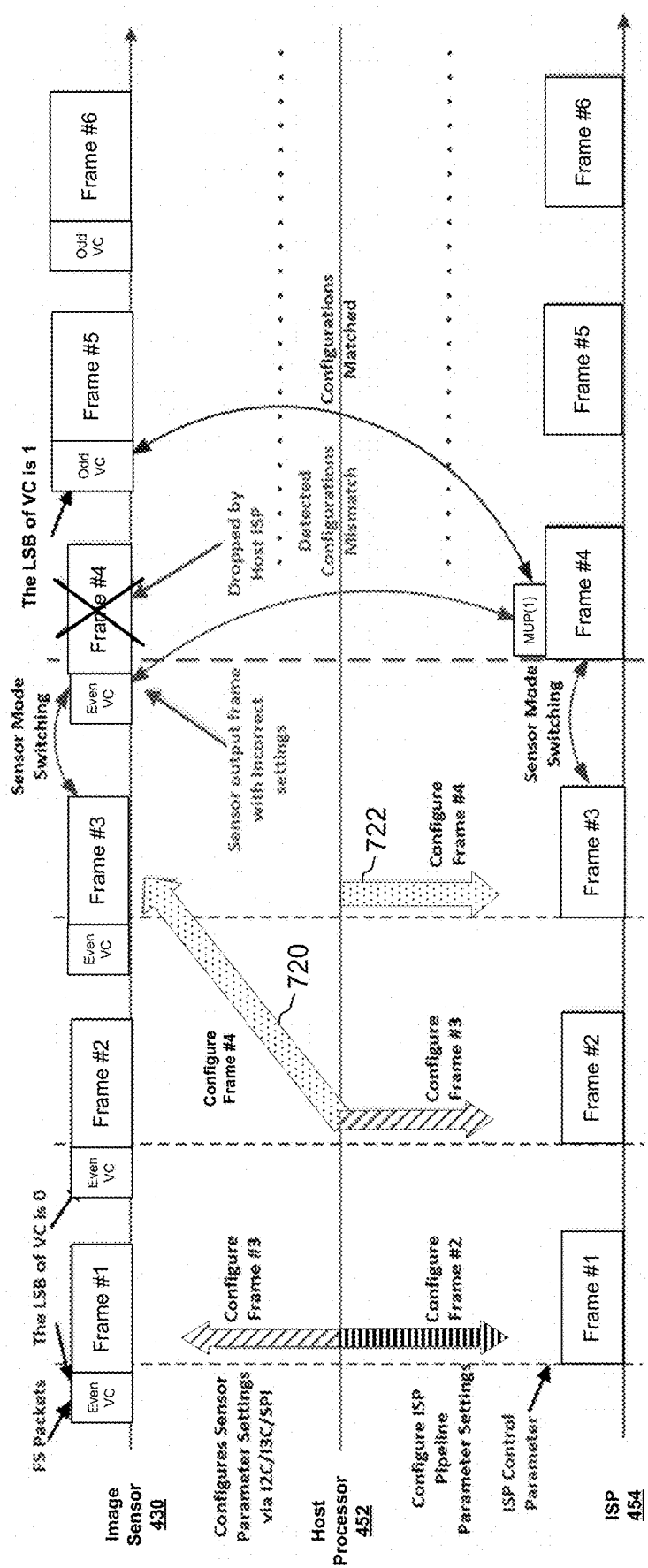
FIG. 7B is a conceptual diagram illustrating operations of a host processor, an image sensor, and an ISP with respect to various image frames, in accordance with some examples.

FIG. 7B is a diagram illustrating operations of the host processor 452, the image sensor 430, and the ISP 454 with respect to various image frames. The image frames in FIG. 7B can include the frame configuration shown in FIG. 7A. To initiate sensor mode switching, the host processor 452 programs the parameters of the image sensor 430 with new mode parameter settings, including odd VCs for frame #4 during the input frame #2 period. The odd VC is used as the new setting change indicator value due to the even VCs being indicated before the new parameter settings change. The host processor 452 also programs the pipeline parameter settings of the ISP 454 for processing according to the new mode, followed by a MUP command control parameter with value of 1 for processing frame #4 during input frame #3 period.

Similar to that described above, the image sensor 430 can implement a grouped parameter hold mechanism in some cases to determine when an update to parameter settings (e.g., mode change parameter settings) will be applied to a given image frame. In such cases, when the grouped parameter is written from a value of 1 to a value of 0, the internal hold state of the image sensor 430 can be cleared and all parameter changes after the hold was implemented can be applied simultaneously on the frame boundary.

The ISP 454 may proceed to process an input image frame when (e.g., only when) a MUP command update event is detected and the value of the MUP is equal to the value in the VC field (e.g., the LS bit of the VC field), such as a value of 0 representing an even number of VCs or a value of 1 representing an even number of VCs. In some cases, the ISP 454 will drop an input image frame (e.g., to avoid a potential system hang or freeze scenario or other negative effects) when one or more conditions are met. For example, the ISP 454 can drop an input image frame when an odd and even VC switching event detected but no MUP command control parameter value is detected. A MUP command control parameter value may not be detected by the ISP 454 when the host processor 452 has not yet sent the MUP command control parameter value to the ISP 454 (e.g., due to some delay in setting the parameters of the ISP 454).

In another example, the ISP 454 may drop an input image frame when a MUP command control parameter value is detected but the value of the portion of the VC field (e.g., the LS bit of the VC field) and the value of the MUP are mismatched (e.g., the value of the MUP command control parameter does not equal the LS bit of the VC field). For example, as shown in FIG. 7B by the arrows with dotted patterns (the arrow 720 from the host processor 452 at the frame #2 period to the image sensor 430 at the frame #3 period and the arrow 722 from the host processor 452 at the frame #3 period to the ISP 454 at the frame #3 period), the image sensor 430 outputs frame #4 with previous parameter settings and thus with an indication of an even number of VCs (e.g., indicated by a value of 0) in the FS packet. In such an example, the ISP 454 can detect a mismatch between the MUP command control parameter value (shown with a value of 1) and the value of the portion of the VC field (shown with an even VC indication). For instance, due to delay of the host processor 452 in programming the image sensor 430 with new mode parameters settings, the ISP 454 detects a MUP command control parameter value (shown with a value of 1) but the LSB of the VC field and the value of the MUP command control parameter will not match at the input frame #4. In such a scenario, the input frame #4 is dropped by the ISP 454 without processing to avoid system hang and/or other effects. As shown, the ISP 454 proceeds to process the input image frame and to switch the sensor mode seamlessly during the input frame #5 period when the MUP command control parameter was detected (with the value of 1) and the value of the MUP command control parameter matches the VC field (with a value, such as 1, indicating an odd number of VCs) of the input frame #5.

The technique described with respect to FIG. 7A and FIG. 7B can use the existing VC field defined in the MIPI CSI-2 protocol Specification. The MIPI CSI-2 protocol has already been broadly adopted and supported by many image sensor and ISP designs, making such a solution practical and easy to implement with lower silicon cost.

The above-described techniques for synchronizing parameter settings updates between an image sensor and an ISP using setting change indicators provide various advantages over prior synchronization techniques. For example, the synchronization techniques described herein can provide a robust closed-loop synchronization mechanism between the image sensor and the ISP to support seamless sensor mode switching frame data processing with the ISP. The various approaches described above provide different ways to achieve the synchronization using setting change indicators. For example, as described above with respect to FIG. 7A and FIG. 7B, synchronization between an image sensor 430 and an ISP 454 can be achieved by toggling odd and even VCs at a frame start (FS) packet (the odd/even VCs acting as a setting change indicator value) to represent in input frame data that a sensor mode switch (in a mode-switching scenario) has taken effect or that certain settings have changed (in a non-mode-switching scenario). In such an example, the ISP 454 can also be provided with a setting change indicator (e.g., the MUP command control parameter) so that the ISP 454 can match the setting change indicator to the setting change indicator (e.g., an even or odd number of VCs) provided by the image sensor. As described above, the MUP command can include a single bit and can be used to guard the update of the ISP parameters by synchronizing with the odd/even pattern of the input frame VC field (0: to match with even VCs; 1: to match with odd VCs). Other types of setting change indicators that can be used to synchronize settings updates between an image sensor and an ISP are described above with respect to FIG. 5A-FIG. 6B.

The ISP can detect sensor mode switching for an input frame from the image sensor in synchronization with the internal pipeline parameter update of the ISP. The ISP can proceed to process input frame data from the image sensor only if both the stored setting change indicator (e.g., the stored MUP command control parameter value) is detected and the value of the setting change indicator (e.g., the stored MUP command control parameter value) is equal to the setting change indicator (e.g., the LSB of a VC field) of an input frame. The ISP can detect that it is out of synchronization with the image sensor and can drop input frame data without processing (e.g., to avoid system hang or freeze) when one of various conditions are met. For example, as described above with respect to FIG. 7A and FIG. 7B, the ISP 454 can detect it is out of synchronization with the image sensor and can drop frame data when an odd and/or even VC switching event is detected but no MUP command is detected, or when a MUP command is detected but the setting change indicator value (e.g., the LS bit) in the VC field and value of MUP command are mismatched. The grouped parameter hold scheme also provides the host processor with a mechanism to update sensor parameters of an image frame at the frame boundary.

Figure 8:
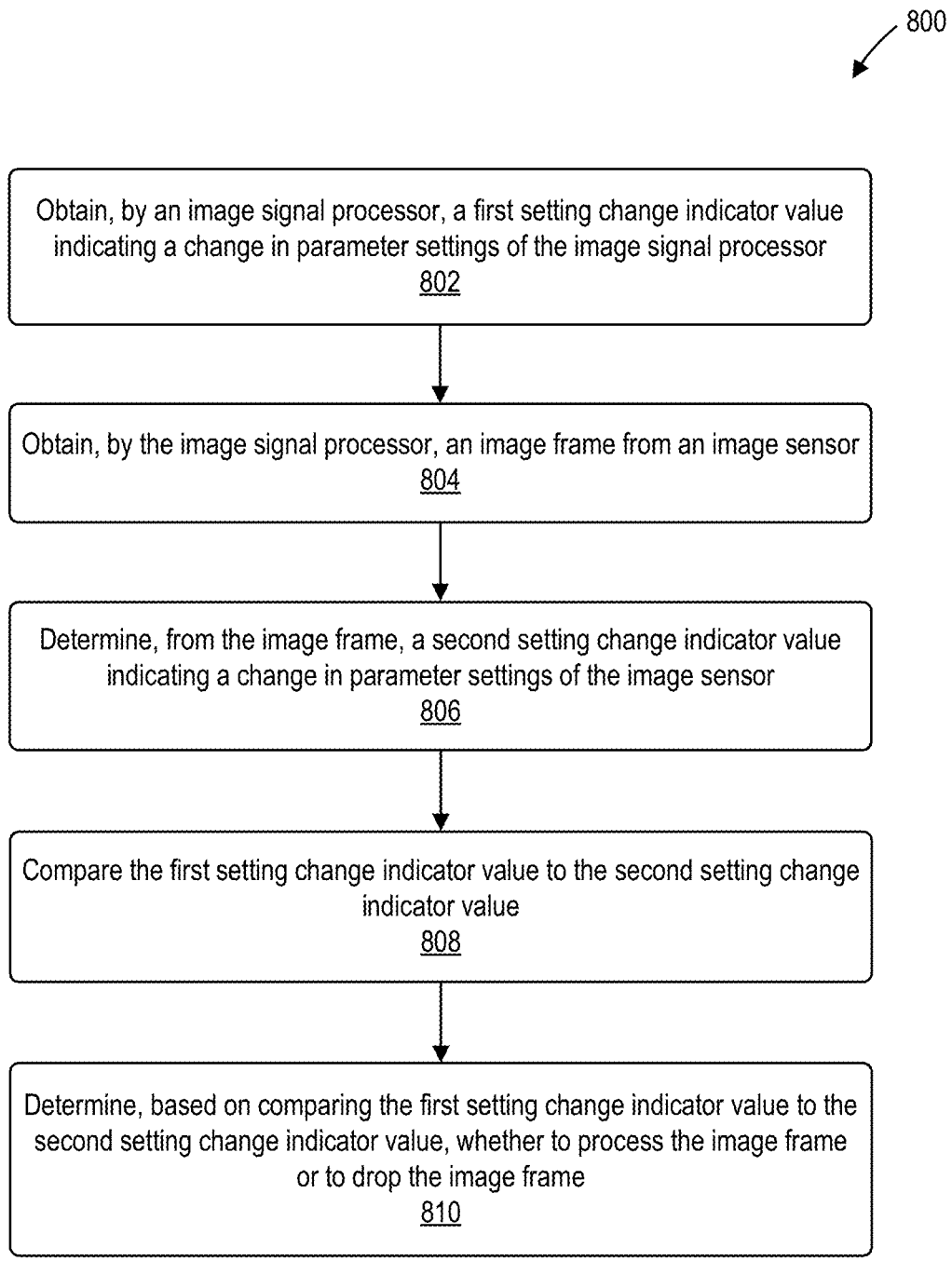
FIG. 8 is a flow diagram illustrating an example of a process for processing image data, in accordance with some examples.

FIG. 8 is a flowchart illustrating an example of a process 800 of processing image data using the techniques described herein. At block 802, the process 800 includes obtaining, by an image signal processor, a first setting change indicator value indicating a change in parameter settings of the image signal processor. For instance, the image signal process can include the ISP 154 of FIG. 1 or the ISP 454 of FIG. 4. In some examples, the first setting change indicator value is received by the image signal processor from a host processor. For instance, the host processor can include the host processor 152 of FIG. 1 or the host processor 452 of FIG. 4. In some examples, the image signal processor can generate the first setting change indicator value based on information received from the host processor. For example, in some examples, the process 800 can include receiving, by the image signal processor from a host processor, information indicating the change in parameter settings of the image signal processor, and generating the first setting change indicator value based on receiving the information from the host processor. In one illustrative example, the information can include a command to change settings of the ISP (in a non-mode-switching scenario) or to change a settings mode of the ISP (in a mode-switching scenario).

At block 804, the process 800 includes obtaining, by the image signal processor, an image frame from an image sensor. For example, the image sensor can include the image sensor 130 of FIG. 1 or the image sensor 430 of FIG. 4. At block 806, the process 800 includes determining, from the image frame, a second setting change indicator value indicating a change in parameter settings of the image sensor. In some examples, the second setting change indicator value is provided to the image sensor from the host processor (e.g., the host processor 152 of FIG. 1 or the host processor 452 of FIG. 4). In some examples, the image sensor can generate the second setting change indicator value based on information received from the host processor. In one illustrative example, the information can include a command to change settings of the image sensor (in a non-mode-switching scenario) or to change a settings mode of the image sensor (in a mode-switching scenario).

In some implementations, the first setting change indicator value includes a mode update (MUP) command control parameter value, and the second setting change indicator value includes a number of bits of a virtual channel (VC) field of a packet of the image frame received from the image sensor. For instance, referring to FIG. 7A and FIG. 7B as illustrative examples, the packet of the image frame can be a frame start (FS) packet, such as FS packet 704. As described above, a number of bits of the VC field in the FS packet 704 can be used as a settings change indicator 706. In some examples, the number of bits of the VC field of the packet of the image frame is a least significant (LS) bit of the packet. Any other bit (or multiple bits in some examples) of the VC field of the packet can be used to specify the second setting change indicator value. In some cases, as described with respect to FIG. 7B, the MUP command control parameter value can be set to a value of 0 to match with even VCs (as indicated by the number of bits of the VC field) and a value of 1 to match with odd VCs (as indicated by the number of bits of the VC field).

In some implementations, the first setting change indicator value includes a mode identifier control parameter value, and the second setting change indicator value includes a mode identifier embedded in a frame header of a packet of the image frame received from the image sensor. For instance, referring to FIG. 5A, FIG. 5B, and FIG. 5C as illustrative examples, the second change indicator value can be embedded into frame header packets 504 (with different VC and DT values as the image frame packets 502) or frame header packets 508 (with a same VC value but a different DT value as the image frame packets 502).

In some implementations, the first setting change indicator value includes a mode identifier control parameter value, and the second setting change indicator value includes a mode identifier included in a packet of the image frame received from the image sensor. For instance, referring to FIG. 6A and FIG. 6B as illustrative examples, the packet of the image frame can be a frame start (FS) packet, such as FS packet 604. In some cases, as shown in FIG. 6A, some or all of the bits of a frame number filed can be replaced with bits representing the setting change indicator 606. For instance, the FS packet can include a settings change indicator field (e.g., a mode identifier field) instead of a frame number field.

At block 808, the process 800 includes comparing the first setting change indicator value to the second setting change indicator value. At block 810, the process 800 includes determining, based on comparing the first setting change indicator value to the second setting change indicator value, whether to process the image frame or to drop the image frame.

In some examples, the process 800 includes determining, based on comparing the first setting change indicator value to the second setting change indicator value, that the first setting change indicator value and the second setting change indicator value match. In such examples, the process 800 includes processing the image frame based on determining that the first setting change indicator value and the second setting change indicator value match. Referring to FIG. 7B as an illustrative example, the ISP can determine that the MUP value of 1 matches the least significant (LS) bit (or other bit or bits) of the VC field of frame #5, which also has a value of 1 (representing an odd VC). Other examples of matching setting change indicator values are discussed above with respect to FIG. 5A-FIG. 5C and FIG. 6A-FIG. 6B.

In some aspects, the process 800 includes determining, based on comparing the first setting change indicator value to the second setting change indicator value, that the first setting change indicator value and the second setting change indicator value do not match In such examples, the process 800 includes dropping the image frame based on determining that the first setting change indicator value and the second setting change indicator value do not match, wherein the image frame is not processed by the image signal processor when the image frame is dropped. Referring to FIG. 7B as an illustrative example, the ISP can determine that the MUP value of 1 does not match the least significant (LS) bit (or other bit or bits) of the VC field of frame #4, which has a value of 0 (representing an even VC). Other examples of setting change indicator values being determined not to match are discussed above with respect to FIG. 5A-FIG. 5C and FIG. 6A-FIG. 6B.

In some examples, the processes described herein (e.g., process 800 and/or other process described herein) may be performed by a computing device or apparatus. In one example, the process 800 can be performed by the image capture and processing system 100 of FIG. 1 and/or the image capture and processing system 400 of FIG. 4. In another example, the process 800 can be performed by the image processing device 105B of FIG. 1. In another example, the process 800 can be performed by a computing device or system with the architecture of the computing system 900 shown in FIG. 9. For instance, a computing device with the architecture of the computing system 900 shown in FIG. 9 can include the components of the image capture and processing system 100 (or the system 400) and can implement the operations of FIG. 8.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 800. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
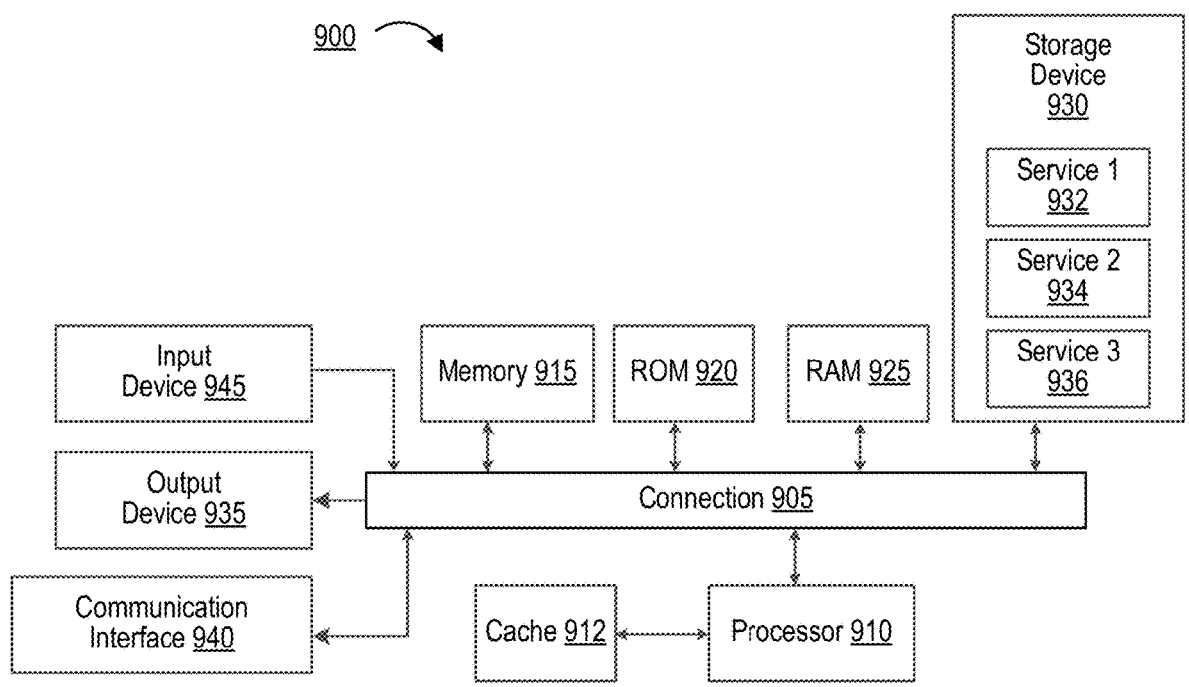
FIG. 9 is a diagram illustrating an example of a system for implementing certain aspects described herein.

FIG. 9 is a diagram illustrating an example of a system for implementing certain aspects of the present technology. In particular, FIG. 9 illustrates an example of computing system 900, which can be for example any computing device making up internal computing system, a remote computing system, a camera, or any component thereof in which the components of the system are in communication with each other using connection 905. Connection 905 can be a physical connection using a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache 912 of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. An apparatus for processing image data, comprising:
 a memory; and
 a processor coupled to the memory, the processor configured to:
  obtain a first setting change indicator value indicating a change in parameter settings of the processor;
  obtain an image frame from an image sensor;
  determine, from the image frame, a second setting change indicator value indicating a change in parameter settings of the image sensor;
  compare the first setting change indicator value to the second setting change indicator value; and
  determine, based on comparing the first setting change indicator value to the second setting change indicator value, whether to process the image frame or to drop the image frame.

2. The apparatus of claim 1, wherein the processor is configured to:
 determine, based on comparing the first setting change indicator value to the second setting change indicator value, that the first setting change indicator value and the second setting change indicator value match; and
 process the image frame based on determining that the first setting change indicator value and the second setting change indicator value match.

3. The apparatus of claim 1, wherein the processor is configured to:
 determine, based on comparing the first setting change indicator value to the second setting change indicator value, that the first setting change indicator value and the second setting change indicator value do not match; and
 drop the image frame based on determining that the first setting change indicator value and the second setting change indicator value do not match, wherein the image frame is not processed by the processor when the image frame is dropped.

4. The apparatus of claim 1, wherein the first setting change indicator value is received by the processor from a host processor.

5. The apparatus of claim 4, wherein the second setting change indicator value is provided to the image sensor from the host processor.

6. The apparatus of claim 1, wherein the processor is configured to:
 receive, from a host processor, information indicating the change in parameter settings of the processor; and
 generate the first setting change indicator value based on receiving the information from the host processor.

7. The apparatus of claim 1, wherein the first setting change indicator value includes a mode update (MUP) command control parameter value, and wherein the second setting change indicator value includes a number of bits of a virtual channel (VC) field of a packet of the image frame received from the image sensor.

8. The apparatus of claim 7, wherein the packet of the image frame is a frame start (FS) packet.

9. The apparatus of claim 7, wherein the number of bits of the VC field of the packet of the image frame is a least significant (LS) bit of the packet.

10. The apparatus of claim 1, wherein the first setting change indicator value includes a mode identifier control parameter value, and wherein the second setting change indicator value includes a mode identifier embedded in a frame header of a packet of the image frame received from the image sensor.

11. The apparatus of claim 1, wherein the first setting change indicator value includes a mode identifier control parameter value, and wherein the second setting change indicator value includes a mode identifier included in a packet of the image frame received from the image sensor.

12. The apparatus of claim 11, wherein the packet of the image frame is a frame start (FS) packet.

13. The apparatus of claim 1, wherein the processor is an image signal processor.

14. The apparatus of claim 1, wherein the apparatus is a camera.

15. The apparatus of claim 1, wherein the apparatus is a mobile device including a camera.

16. The apparatus of claim 1, further comprising a display configured to display one or more images.

17. The apparatus of claim 1, further comprising a camera configured to capture one or more images.

18. The method of claim 1, wherein the first setting change indicator value includes a mode update (MUP) command control parameter value, and wherein the second setting change indicator value includes a number of bits of a virtual channel (VC) field of a packet of the image frame received from the image sensor.

19. The method of claim 18, wherein the packet of the image frame is a frame start (FS) packet.

20. The method of claim 18, wherein the number of bits of the VC field of the packet of the image frame is a least significant (LS) bit of the packet.

21. A method of processing image data, the method comprising:
 obtaining, by an image signal processor, a first setting change indicator value indicating a change in parameter settings of the image signal processor;
 obtaining, by the image signal processor, an image frame from an image sensor;

determining, from the image frame, a second setting change indicator value indicating a change in parameter settings of the image sensor;
comparing the first setting change indicator value to the second setting change indicator value; and
determining, based on comparing the first setting change indicator value to the second setting change indicator value, whether to process the image frame or to drop the image frame.

22. The method of claim 21, further comprising:
determining, based on comparing the first setting change indicator value to the second setting change indicator value, that the first setting change indicator value and the second setting change indicator value match; and
processing the image frame based on determining that the first setting change indicator value and the second setting change indicator value match.

23. The method of claim 21, further comprising:
determining, based on comparing the first setting change indicator value to the second setting change indicator value, that the first setting change indicator value and the second setting change indicator value do not match; and
dropping the image frame based on determining that the first setting change indicator value and the second setting change indicator value do not match, wherein the image frame is not processed by the image signal processor when the image frame is dropped.

24. The method of claim 21, wherein the first setting change indicator value is received by the image signal processor from a host processor.

25. The method of claim 24, wherein the second setting change indicator value is provided to the image sensor from the host processor.

26. The method of claim 21, further comprising:
receiving, by the image signal processor from a host processor, information indicating the change in parameter settings of the image signal processor; and
generating the first setting change indicator value based on receiving the information from the host processor.

27. The method of claim 21, wherein the first setting change indicator value includes a mode identifier control parameter value, and wherein the second setting change indicator value includes a mode identifier embedded in a frame header of a packet of the image frame received from the image sensor.

28. The method of claim 21, wherein the first setting change indicator value includes a mode identifier control parameter value, and wherein the second setting change indicator value includes a mode identifier included in a packet of the image frame received from the image sensor.

29. The method of claim 28, wherein the packet of the image frame is a frame start (FS) packet.

30. A non-transitory computer-readable storage medium storing instructions that, when executed by one or more processors, cause the one or more processors to: obtain a first setting change indicator value indicating a change in parameter settings of a processor; obtain an image frame from an image sensor; determine, from the image frame, a second setting change indicator value indicating a change in parameter settings of the image sensor; compare the first setting change indicator value to the second setting change indicator value; and determine, based on comparing the first setting change indicator value to the second setting change indicator value, whether to process the image frame or to drop the image frame.

* * * * *